United States Patent
Tseng

(10) Patent No.: US 7,490,278 B2
(45) Date of Patent: Feb. 10, 2009

(54) PCI EXPRESS PHYSICAL LAYER BUILT-IN SELF TEST ARCHITECTURE

(75) Inventor: Wayne Tseng, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 634 days.

(21) Appl. No.: 11/162,153

(22) Filed: Aug. 30, 2005

(65) Prior Publication Data
US 2006/0123298 A1 Jun. 8, 2006

Related U.S. Application Data

(60) Provisional application No. 60/522,812, filed on Nov. 9, 2004.

(51) Int. Cl.
*G01R 31/28* (2006.01)
*G06F 11/00* (2006.01)

(52) U.S. Cl. .................. 714/733; 714/704; 714/712

(58) Field of Classification Search .................. None
See application file for complete search history.

(56) References Cited

U.S. PATENT DOCUMENTS

| | | | | |
|---|---|---|---|---|
| 6,574,758 | B1 * | 6/2003 | Eccles | 714/712 |
| 7,062,688 | B2 * | 6/2006 | Gauthier et al. | 714/712 |
| 2004/0044938 | A1 * | 3/2004 | Heo | 714/738 |

* cited by examiner

*Primary Examiner*—Christine T Tu
(74) *Attorney, Agent, or Firm*—Winston Hsu

(57) ABSTRACT

A built-in self test circuit includes a first pattern generator, an elastic buffer receiver, a command symbol detector, a second pattern generator, and a logic unit. The architecture is capable of compensating loopback latency automatically without having to utilize a device that stores test patterns generated by the first pattern generator, and error warning can be greatly reduced. Also, the architecture can reduce the effect of phase jitter and error rate count is provided. Hence, accuracy of test can be increased.

20 Claims, 3 Drawing Sheets

US 7,490,278 B2

PCI EXPRESS PHYSICAL LAYER BUILT-IN SELF TEST ARCHITECTURE

CROSS REFERENCE TO RELATED APPLICATIONS

This application claims the benefit of U.S. Provisional Application No. 60/522,812, filed Nov. 9, 2004, and included herein by reference.

BACKGROUND OF THE INVENTION

1. Field of the Invention

The present invention relates to a built-in test circuit, more particularly a PCI Express physical layer built-in test circuit capable of detecting command symbols to automatically compensate loopback latency.

2. Description of the Prior Art

In the development of personal computer systems and peripheral devices, bandwidth and speed requirements of the interconnect interface are increasing. The load of a conventional PCI device becomes greater, therefore the third generation input/output (3GIO) has gradually replaced PCI interface to provide the greater bandwidth requirement. The third generation input/output (3GIO) is also known as a PCI Express interface. Those skilled in the arts know that the PCI Express technology utilizes a higher operational clock and applies more data lanes to improve efficiency. The first generation PCI Express technology can provide 2.5 GB per second of bandwidth in a one directional data lane, which is great improvement for the efficiency of the computer system especially in pattern processing.

The PCI Express device operates at a high-speed transmission where volume of data transmission is high. As the accuracy of signals must be maintained, a conventional built-in self test (BIST) method tests the accuracy of symbols received by the PCI Express device. A test pattern generator (TPG) and an output response analysis (ORA) are built-in to a lane under test. Please refer to FIG. 1. FIG. 1 illustrates a diagram of a conventional PCI Express physical layer built-in self test circuit architecture 100. The architecture 100 includes a pattern generator 102, an elastic buffer receiver 104, a pattern register 106, a pattern comparison module 108, and a lane under test 110. The pattern generator 102 generates a test pattern to the lane under test 110 and the pattern register 106, then the elastic buffer receiver 104 receives and transmits the test patterns via the lane under test 110 to the pattern comparison module 108, and the pattern register 106 temporarily stores and transmits the test patterns in a predetermined time to the pattern comparison 108. The test pattern received by the elastic buffer receiver 104 and the test pattern stored in the pattern register 106 are compared, the pattern comparison module 108 determines whether the lane under test 110 correctly transmits the test pattern generated by the pattern generator 102.

The conventional built-in self test circuit architecture 100 does not require an external automatically test equipment (ATE) to generate a test vector, also it is not required by the ATE to analyze test results. Therefore the test bandwidth requirement is less than general test methods, and test speed is not limited by the ATE speed hence it is more efficient. However, the lane under test 110 of the PCI Express includes a plurality of loopback paths, which also means that time required by the test patterns to pass through the lane under test 110 is not constant, so that the loopback latency cannot be predicted. Therefore the storage capacity of the pattern register 106 must be sufficiently large to compensate the loopback latency. Furthermore, the built-in self test circuit architecture 100 will be affected by phase jitter which causes errors in the pattern comparison module 108. Moreover, the storage capacity of the pattern register 106 must be restricted; therefore when the loopback latency becomes too great, the built-in self test architecture 100 will not operate accurately.

SUMMARY OF THE INVENTION

The claimed invention provides a PCI Express physical layer built-in test circuit for compensating loopback latency.

The claimed invention provides a PCI Express physical layer built-in self test circuit includes: a first pattern generator couples to a lane under test for generating a first test pattern to the lane under test; an elastic buffer receiver couples to the lane under test for receiving a test result pattern outputted from the lane under test; a command symbol detector couples to the elastic buffer receiver for detecting the test result pattern, wherein an enabling signal is outputted when a command symbol is detected; a second pattern generator couples to the command symbol detector for generating a second test pattern similar to the first test pattern according to the enabling signal; and a logic unit couples to the elastic buffer receiver and the second pattern generator for comparing the test result pattern and the second test pattern.

The claimed invention further provides a PCI Express physical layer built-in self test circuit for compensating loopback latency, the built-in self test circuit includes: a test unit for generating and utilizing a first test pattern to test a lane under test and generate a first test result pattern; a detecting unit couples to the test unit for detecting whether there is a command symbol; and a compare unit couples to the test unit and the detecting unit, wherein when the detecting unit detects the command symbol, the compare unit generates a second test pattern to be compared with the test result pattern and the second test pattern is similar to the first test pattern.

The claimed invention further provides a self test method for testing a lane under test, the method includes: utilizing a first test pattern to test the lane under test and generating a test result pattern; detecting the test result pattern, wherein when a command symbol is detected, a second test pattern similar to the first test pattern is generated; and comparing the test result pattern and the second test pattern.

These and other objectives of the present invention will no doubt become obvious to those of ordinary skill in the art after reading the following detailed description of the preferred embodiment that is illustrated in the various figures and drawings.

BRIEF DESCRIPTIONS OF THE DRAWINGS

DETAILED DESCRIPTION

Figure 1:
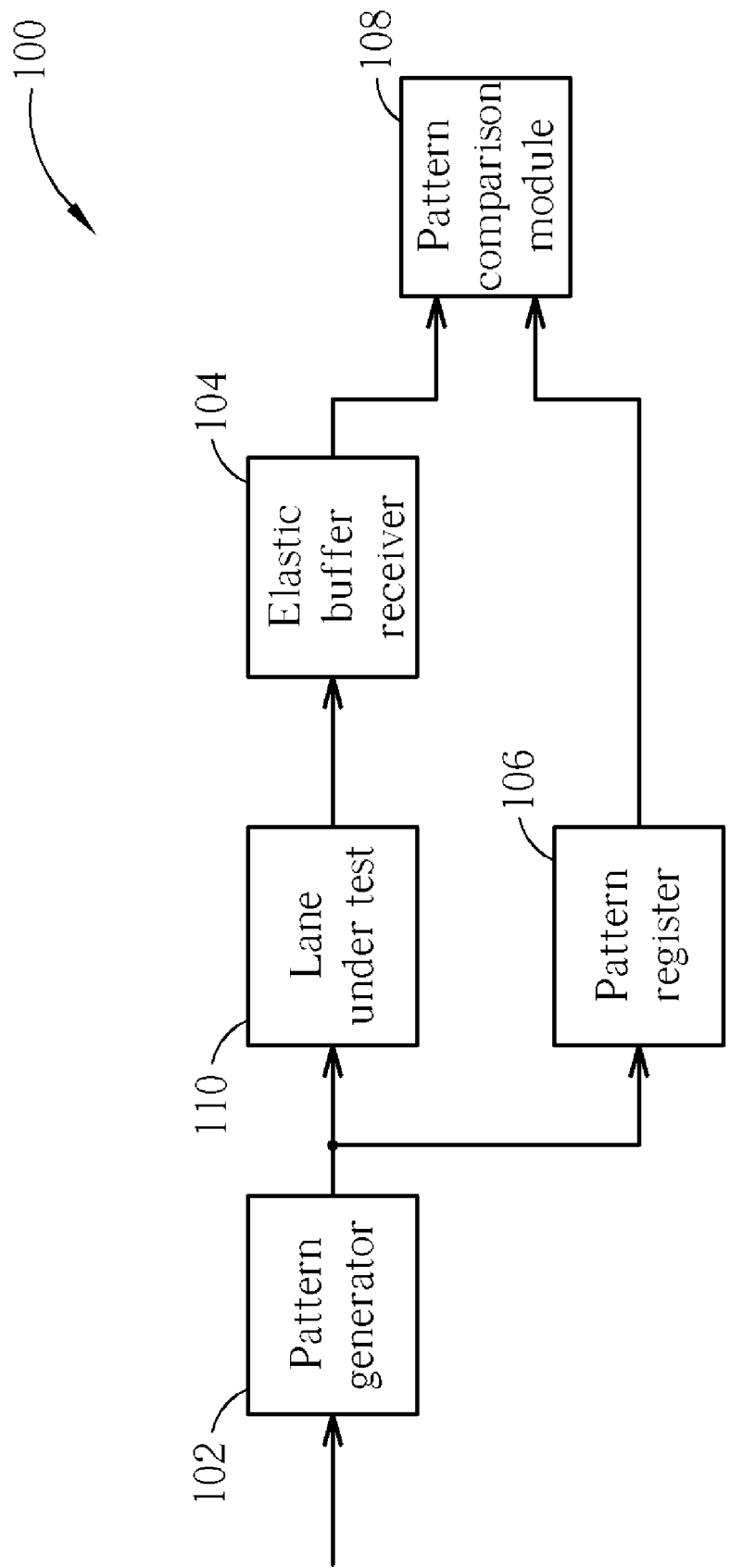
FIG. 1 illustrates a diagram of a conventional PCI Express physical layer built-in self test circuit architecture.
Figure 2:
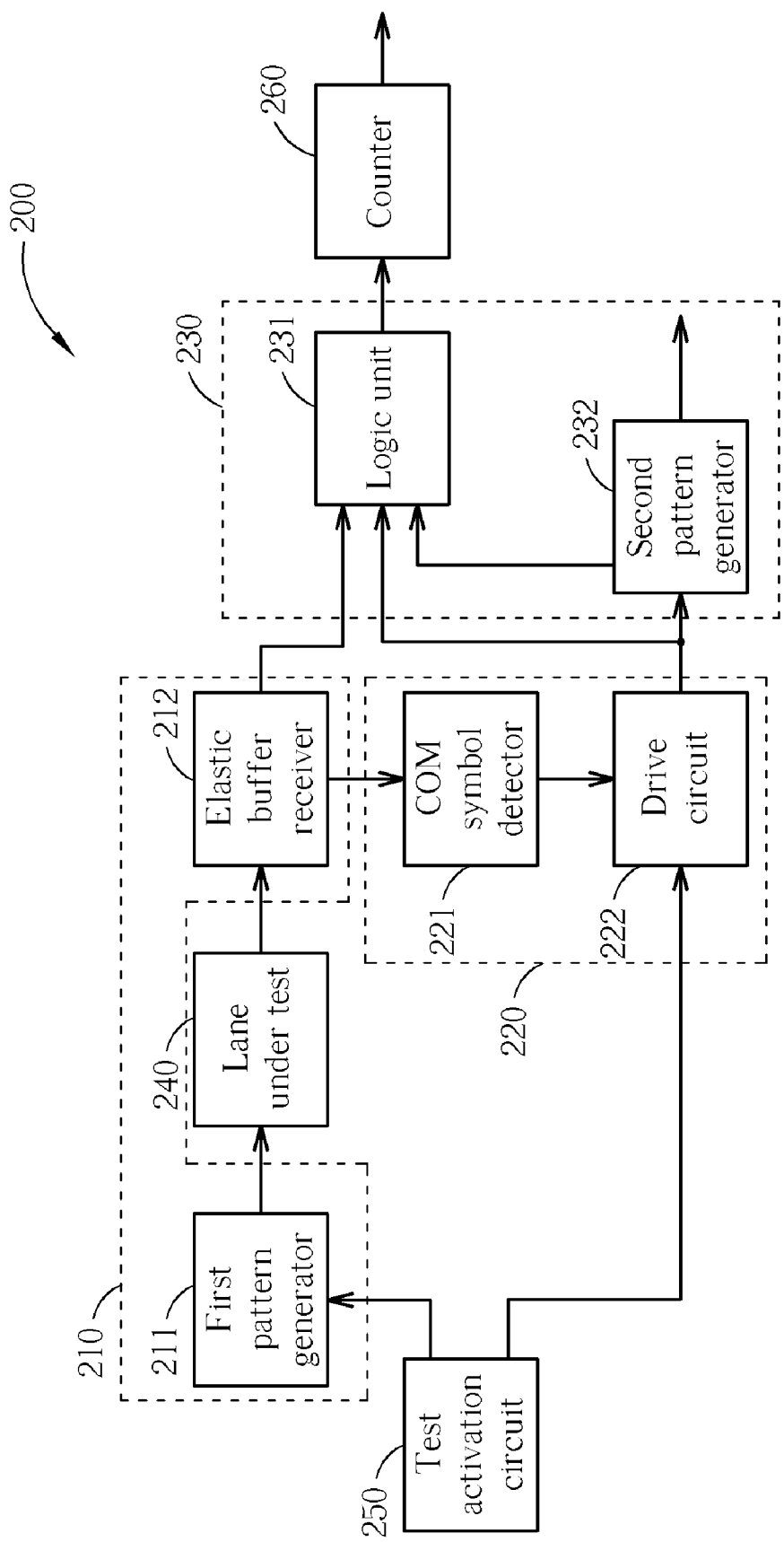
FIG. 2 illustrates a diagram of a PCI Express physical layer built-in test circuit architecture.

Please refer to FIG. 2. FIG. 2 illustrates a diagram of a PCI Express physical layer built-in test circuit architecture 200. The architecture 200 is capable of compensating loopback latency of the PCI Express, wherein the architecture 200 includes a test unit 210, a detecting unit 220, and a compare unit 230. The test unit 210 includes a first pattern generator 211 and an elastic buffer receiver 212. The detecting unit 220 includes a command (COM) symbol detector 221 and a drive circuit 222. The compare unit 230 includes a second pattern generator 232 and a logic unit 231. Furthermore, the built-in self test circuit 200 further includes a test activation circuit 250 and a counter 260. In FIG. 2, a lane under test 240 is a lane in the PCI Express physical layer required to be tested. The operating method of the built-in self test circuit architecture 200 will be explained in the following.

According to the standards of the PCI Express, each sequence symbol transmitted by a transmission end of the PCI Express has a COM symbol that is utilized for indicating a COM with sequence symbol. The present invention utilizes a method of detecting COM symbols to overcome the prior art. In FIG. 2, the activation circuit 250 drives the first pattern generator 211 to generate a first test pattern to test the lane under test 240 and activates the drive circuit 222. The elastic buffer receiver 212 receives and then outputs the test result pattern to the command symbol detector 221 and the logic unit 231. As mentioned previously, under the PCI Express standards, the COM symbol is utilized for indicating a starting of sequence symbol. When the COM symbol detector 221 detects a COM symbol within the test resulted pattern, the command symbol detector 221 will activate the drive circuit 222 to indicate the second pattern generator 232 to generate a second test pattern which is similar to the first test pattern, and also to indicate to the logic unit 231 to perform comparison of the test result pattern and the second test pattern.

In other words, no matter what the latency caused due to the loopback path in the lane under test 240, the second pattern generator 232 will only output the second test pattern, which is similar to the first test pattern, when the command symbol detector 221 detects the COM symbol within the test result pattern. By comparing the test result pattern received by the elastic buffer receiver 212 and the second test pattern generated by the second pattern generator 232, the logic unit 231 can determine whether the first test pattern transmitted by the lane under test 240 is accurate.

In short, as the lane under test 240 has a plurality of loopback paths which means that time required by the test patterns to pass through the lane under test 240 is not constant, so that the loopback latency cannot be accountable. The method of detecting COM symbols is capable of compensating the loopback latency automatically. Furthermore, the counter 260 counts the difference frequency between the second test pattern generated by the second pattern generator 232 and the test result pattern received by the elastic buffer receiver 212 within a predetermined time period. Hence, bit error rate (BER) can be figured out via an error rate detection circuit. Also, the first pattern generator 211 and the second pattern generator 232 can be further coupled to a test pattern selector for selecting different types of test patterns to execute different types of tests.

Figure 3:
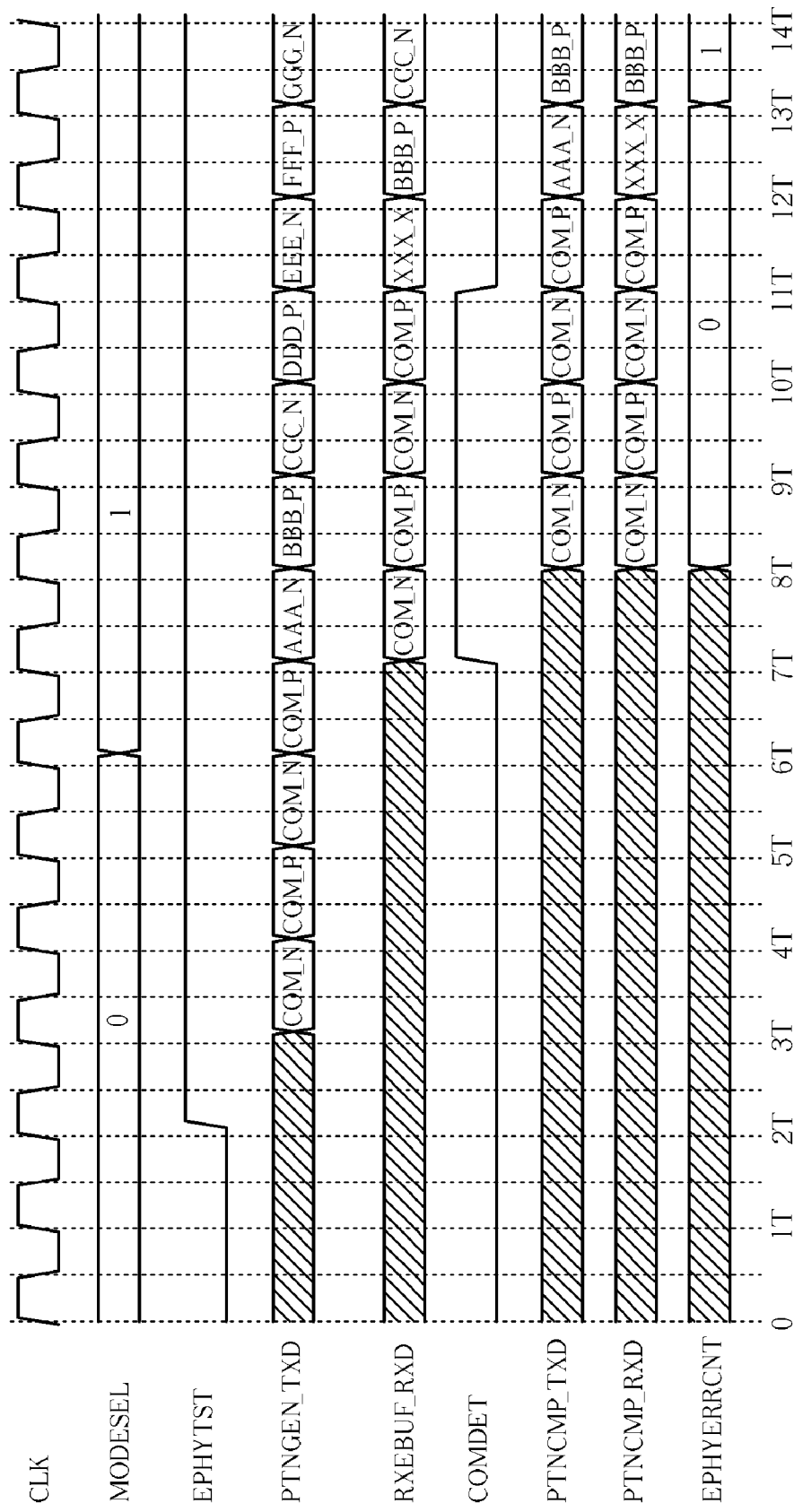
FIG. 3 illustrates a related wave diagram of a built-in self test circuit architecture.

Please refer to FIG. 2 and FIG. 3. FIG. 3 illustrates a related wave diagram of a built-in self test circuit architecture 200 of FIG. 2. In FIG. 3, a signal CLK represents system clock, and each cycle is T. A signal MODELSEL represents signals outputted by the test pattern selector for indicating different test patterns outputted by the first pattern generator 211 and the second pattern generator 232. A signal EPHYST represents signals outputted by the test activation circuit 250 for indicating test start. A signal PTNGEN_TXD represents signals outputted by the first pattern generator 211 and a signal RXEBUF_RXD represents signal received by the elastic buffer receiver 212. A signal COMDET represents signals outputted by the COM symbol detector 221, the COM symbol detector can output a high square wave when a COM symbol is detected. A signal PTNCMP_TXD represents signals generated by the second pattern generator 232, a signal PTNCMP_RXD represents signals received by the logic unit 231 via the elastic buffer receiver 212. A signal EPHYERRCNT represents signals outputted by the counter 260.

As shown in FIG. 3, when the signal EPYHTST triggers from low to high level state at 2T, the test begins, therefore the first pattern generator 202 outputs a test pattern at 3T. The leading four symbols of the signal PTNGEN_TXD are COM symbols, a block COM_N represents the COM symbol in a negative running disparity status, and a block COM_P represents the COM symbol in a positive running disparity status. During 6T, the signal MODESEL triggers from 0 to 1, which means that the test mode is changed. Therefore, during 7T, the first pattern generator 202 begins to output test patterns AAA_N, BBB_P, CCC_N and so forth. If the latency time of the lane under test 240 of FIG. 2 is four cycles, then during 6T the elastic buffer receiver 212 begins to receive signals outputted from the first pattern generator 211. Because the first four blocks of the signal RXEBUF_RXD at 7T are COM, therefore the signal COMDET is at a high state from 7T to 10T, and the second pattern generator 232 at 8T begins to generate a second test pattern which is similar to the first test pattern. In this example, if the lane under test 240 is unable to transmit the test pattern AAA_N accurately and an error block XXX_X is generated, after the logic unit 231 compares the signal PTNCMP_TXD and the signal PTNCMP_RXD, and 1 is outputted at cycle 13T which represents that a block in the signals PTNCMP_TXD and PTNCMP_RXD is different.

In conclusion, as the above-mentioned, when the COM symbol is detected in the present invention, a second test pattern, similar to the first test pattern, is generated by the second pattern generator. Hence, the present invention is capable of compensating loopback latency automatically and a device that stores test patterns of the first pattern generator is not required, and an error warning is greatly reduced. Furthermore, the present invention is capable of counting the error rate, therefore, the lane under test can be analyzed more effectively.

In comparison to the prior art, the present invention does not consider the loopback latency and the present invention can reduce the effect of phase jitter and provides error rate count. Therefore, the present invention overcomes the defect of the prior art and hence the accuracy of the test is greatly increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A built-in self test circuit comprising:
   a first pattern generator coupled to a lane under test for generating a first test pattern to test the lane under test;
   an elastic buffer receiver coupled to the lane under test for receiving a test result pattern outputted from the lane under test, wherein the test result pattern is generated according to the first test pattern;
   a command symbol detector coupled to the elastic buffer receiver for detecting whether a command symbol is in the test result pattern, wherein an enabling signal is outputted when the command symbol is detected;
   a second pattern generator coupled to the command symbol detector for generating a second test pattern similar to the first test pattern according to the enabling signal; and a logic unit coupled to the elastic buffer receiver and the second pattern generator for comparing the test result pattern and the second test pattern.

2. The built-in self test circuit of claim 1, further comprising a counter coupled to the logic unit for accumulating frequency difference between the test result pattern and the second test pattern.

3. The built-in self test circuit of claim 2, wherein the counter is further coupled to an error rate detecting circuit for figuring out an error rate of the lane under test according to a result of the counter.

4. The built-in self test circuit of claim 1, further comprising a test pattern selector for selecting different types of test patterns to execute different types of tests.

5. The built-in self test circuit of claim 1, further comprising a test activation circuit for indicating a test start.

6. The built-in self test circuit of claim 1, further comprising a drive circuit coupled to the command symbol detector for driving the second pattern generator and the logic unit when the command symbol detector outputs the enabling signal.

7. A built-in self test circuit for testing a lane under test, the built-in self test circuit comprising:
    a test unit coupled to the lane under test for generating a first test pattern to test the lane under test, receiving a test result pattern generated by the lane under test according to the first test pattern, and outputting the test result pattern;
    a detecting unit coupled to the test unit for detecting whether a command symbol is in the test result pattern; and
    a compare unit coupled to the test unit and the detecting unit;
    wherein when the detecting unit detects the command symbol within the test result pattern, the compare unit generates a second test pattern for being compared with the test result pattern, wherein the second test pattern is similar to the first test pattern.

8. The built-in self test circuit of claim 7, wherein the test unit comprises:
    a first pattern generator for generating the first test pattern; and
    an elastic buffer receiver coupled to the lane under test for receiving the test result pattern and outputting the test result pattern to the detecting unit and the compare unit.

9. The built-in self test circuit of claim 8, further comprising a test pattern selector coupled to the first pattern generator for selecting different test patterns to execute different types of tests.

10. The built-in self test circuit of claim 7, wherein the detecting unit comprises a command symbol detector for detecting whether a command symbol is in the test result pattern.

11. The built-in self test circuit of claim 10, wherein the detecting unit further comprises a drive circuit coupled to the command symbol detector for driving the compare unit to generate the second test pattern for being compared with the test result pattern when the command symbol is detected.

12. The built-in self test circuit of claim 7, wherein the compare unit further comprises:
    a second pattern generator coupled to the detecting unit for generating the second test pattern; and
    a logic unit coupled to the test unit, the detecting unit, and the second pattern generator for comparing the test result pattern and the second test pattern.

13. The built-in self test circuit of claim 12, further comprising a test pattern selector coupled to the second pattern generator for selecting different test pattern to execute different types of tests.

14. The built-in self test circuit of claim 7, further comprising a test activation circuit for driving the test unit and the detecting unit.

15. The built-in self test circuit of claim 7, further comprising a counter coupled to the compare unit for counting frequency difference between the test result pattern and the second test pattern.

16. The built-in self test circuit of claim 15, further comprising an error rate detection circuit for figuring out an error rate of the lane under test according to the counting result.

17. The built-in self test circuit of claim 7, wherein the lane under test is applicable to a PCI Express device.

18. A self test method for testing a lane under test, the method comprising:
    utilizing a first test pattern to test the lane under test to generate a test result pattern according to the first test pattern;
    detecting whether a command symbol is in the test result pattern, wherein a second test pattern is generated similar to the first test pattern when the command symbol is detected; and
    comparing the test result pattern and the second test pattern.

19. The method of claim 18 further comprising counting frequency difference between the test result pattern and the second test pattern, and figuring out an error rate of the test method.

20. The method of claim 18 wherein the method is applicable to a PCI Express device.

* * * * *